United States Patent [19]

East et al.

[11] Patent Number: 5,623,551
[45] Date of Patent: Apr. 22, 1997

[54] LINEAR CONTROL ARRANGEMENTS

[75] Inventors: John W. East, Witney; Paul Frindle, Charlbury, both of England

[73] Assignee: Sony Corporation, Tokyo, Japan

[21] Appl. No.: 73,550

[22] Filed: Jun. 9, 1993

[30] Foreign Application Priority Data

Jul. 20, 1992 [GB] United Kingdom .................. 9215401

[51] Int. Cl.⁶ .................................................... H04B 1/00
[52] U.S. Cl. .......................... 381/119; 381/104; 381/109
[58] Field of Search .................................... 381/119, 109, 381/104; 84/200, 336

[56] References Cited

U.S. PATENT DOCUMENTS 4,879,751  11/1989  Franks et al. ............................ 381/119
5,060,272  10/1991  Suzuki .................................... 381/119

FOREIGN PATENT DOCUMENTS 2140248  11/1984  United Kingdom .................. 381/119

Primary Examiner—Curtis Kuntz
Assistant Examiner—Huyen D. Le
Attorney, Agent, or Firm—William S. Frommer; Alvin Sinderbrand

[57] ABSTRACT

A linear control arrangement, of which a plurality may be provided in an audio mixing console, includes a fader potentiometer having a knob in which a tactile switch is recessed. The switch enables and inhibits recording and/or amending of the fader movement history, and allows ready overwriting or other amendment of existing fader movement data when required. The arrangement allows single finger operation of both the knob and the switch, as well as overcoming the need to provide separate space on the panel for the switch.

1 Claim, 5 Drawing Sheets

LINEAR CONTROL ARRANGEMENTS

BACKGROUND OF THE INVENTION

1. Field of the Invention

This invention relates to linear control arrangements, such as fader controls used in audio mixing consoles for mixing a number of audio channels.

2. Description of the Prior Art

It is known for audio mixing consoles to be provided with an audio mix automation facility which allows audio levels to be recorded and replayed referenced to a time code signal synchronized to the audio signals. This facility enables audio balance engineers to build up sound mixes in stages over a period of time. Often, there are so many audio channels that it would otherwise be impractical, even for a number of engineers, to control all the channels successfully in one pass of a mix.

Such systems comprise a number of linear faders, generally one per audio channel, which facilitate control of the audio levels by appropriate movement of the faders. As the faders are moved, referenced to the audio and hence the time code, data from control tracks on the faders is recorded via a computer which is itself referenced to the time code. Subsequently, such as in another pass, the fader movements, which have been recorded as fader data in the computer, may be replayed, again referenced to the audio and the time code. This may, for example, be accomplished by using motorized linear audio faders in the console and arranging for the replay data to control the motorized faders; alternatively the replay data may be supplied to voltage controlled amplifiers or the like for setting the audio level.

In order to instruct the computer to record the fader movement data, switches are normally provided. Also, each fader will generally have at least one switch associated with it in order to enable the individual audio channels to have their fader movement data recorded by the computer. This provision of individual switches for respective faders/channels is necessary to permit mixing in a number of passes. Also, it is necessary if a change to individual channel settings is required subsequently. For example, this may be necessary if a mistaken movement is made during mixing. The error may only apply to a small section of the complete programme. After the error has been identified, the respective part of the programme is replayed and, at the appropriate time, the switch to start recording fader movement data is pressed and the correct fader movements carried out. Since the switch has been pressed, the computer is instructed to overwrite the previous movement data. Once the section to be corrected has finished, the switch is pressed again to stop the computer recording the new movement data and overwriting the previous data. Rather than overwriting the original movement data, this can instead be trimmed so that the original profile is maintained, but at a higher or lower level. By either of these means, an amended section of movement data can be inserted into the previous mix. However, since the switch is normally positioned adjacent the linear fader on the console panel, remixing is generally a two-handed operation, one hand being used to press the switch whilst the other operates the fader knob. Also, extra panel space needs to be provided in order to accommodate the switch; this is a particular disadvantage in a system for mixing a large number of audio channels.

SUMMARY OF THE INVENTION

It is an object of the present invention to provide a linear control arrangement, such as a fader control, in which operator activation of an associated switch is facilitated.

It is another object of the present invention to provide a linear control arrangement, such as a fader control, in which single finger operator activation of an associated switch is made possible.

It is a further object of the present invention to provide a linear control arrangement, such as a fader control, in which space on a mounting panel for the control arrangement and associated switch is reduced.

According to the invention there is provided a linear control arrangement comprising a linear potentiometer for varying the value of a parameter, the potentiometer including a knob for manual adjustment of the potentiometer, control means for recording and/or amending movement data representative of the value of the parameter as varied by movement of the linear potentiometer, and a switch for selectively enabling and disabling recording and/or amending of the movement data by the control means, wherein the switch is fitted within the knob of the potentiometer and has a manually-operable part accessible to a user.

In a preferred embodiment of the invention, the switch is a push-type tactile switch having its switch button partially recessed within the lowest part of the curved profile of the potentiometer knob. By arranging fop the switch button to be just proud of the potentiometer knob, the chances of inadvertent activation of the switch ape minimized. The switch is preferably mounted on a structure such as a printed circuit board retained within the potentiometer knob. The operation of the switch involves a single activation fop 'record movement data' with a subsequent single activation fop 'stop recording movement data', and so on. Thus the switch simulates the operation of a 'push-on push-off' type although it is mope convenient fop the switch to be a simple unlatched 'push-on' type with the requisite latching provided by circuitry within the control means.

The control arrangement embodying the invention thus has the advantage for the user that both moving the potentiometer knob and pushing the switch may be accomplished with one finger of one hand. Thus other manual control operations can be simultaneously undertaken by the user. Also, since the switch is wholly retained within the potentiometer knob, it requires no extra space on the console panel which, fop a multi-channel console, leads to a significant reduction in panel size.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
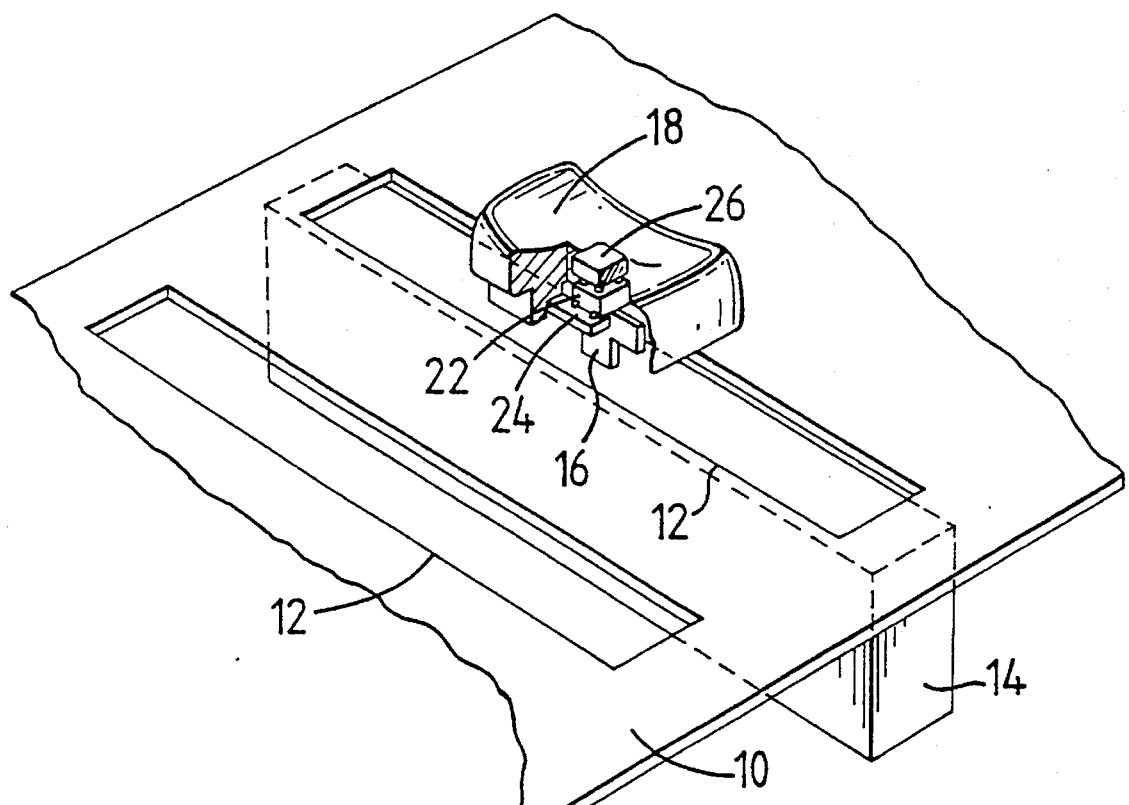
FIG. 1 is a partially cut-away perspective view of a potentiometer knob and switch according to an embodiment of the invention.

Referring to FIG. 1, there is shown part of a fader mounting plate 10 for an audio mixing console or the like, the fader mounting plate 10 including a number of rectangular openings 12. The openings 12 are for retaining fader potentiometers 14 (only one of which is shown for simplicity). An adjusting lever 16 for each fader potentiometer 14 has attached thereto a fader knob 18 with a curved top profile for finger operation.

As thus far described, the fader arrangement is similar to those in current use. However, as described above, if a selective record and overwrite fader movement data feature is to be provided, the known arrangement includes provision of a switch on the console panel adjacent to the respective fader. As discussed, this has the disadvantages of requiring two-handed operation, and also taking up valuable panel space.

In contrast to this, the arrangement shown in FIG. 1 includes a tactile switch 22 mounted on a printed circuit board (PCB) 24, the tactile switch 22 having a switch button 26 protruding through an aperture in the top surface of the fader knob 18. Preferably, the switch button 26 is arranged (in its non-activated state) to lie just proud of the top surface of the fader knob 18. As a result of this semi-recessed configuration, the chances of inadvertent activation of the switch are minimized. The PCB 24, on which the tactile switch 22 is mounted, is attached to the fader knob 18 and/or the fader adjusting lever 16 thereby providing a solid mounting for the switch 22.

Figure 2:
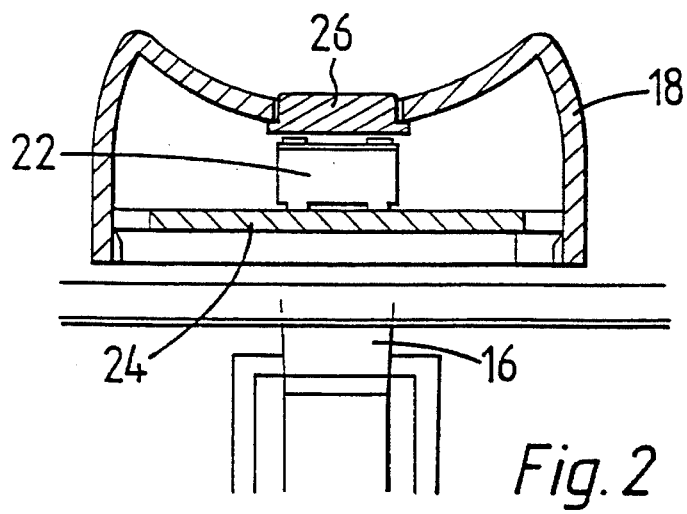
FIG. 2 is an enlarged side sectional view of the knob and switch shown in FIG. 1, the section being along the vertical plane which includes the central longitudinal axis of the knob.

FIG. 2 is a cross-sectional view of the fader knob 18, showing the mounting of the PCB 24 and the tactile switch 22 in more detail. In particular, it will be seen that the switch button 26 protrudes only slightly above the surrounding part of the top surface of the fader knob 18.

Figure 3:
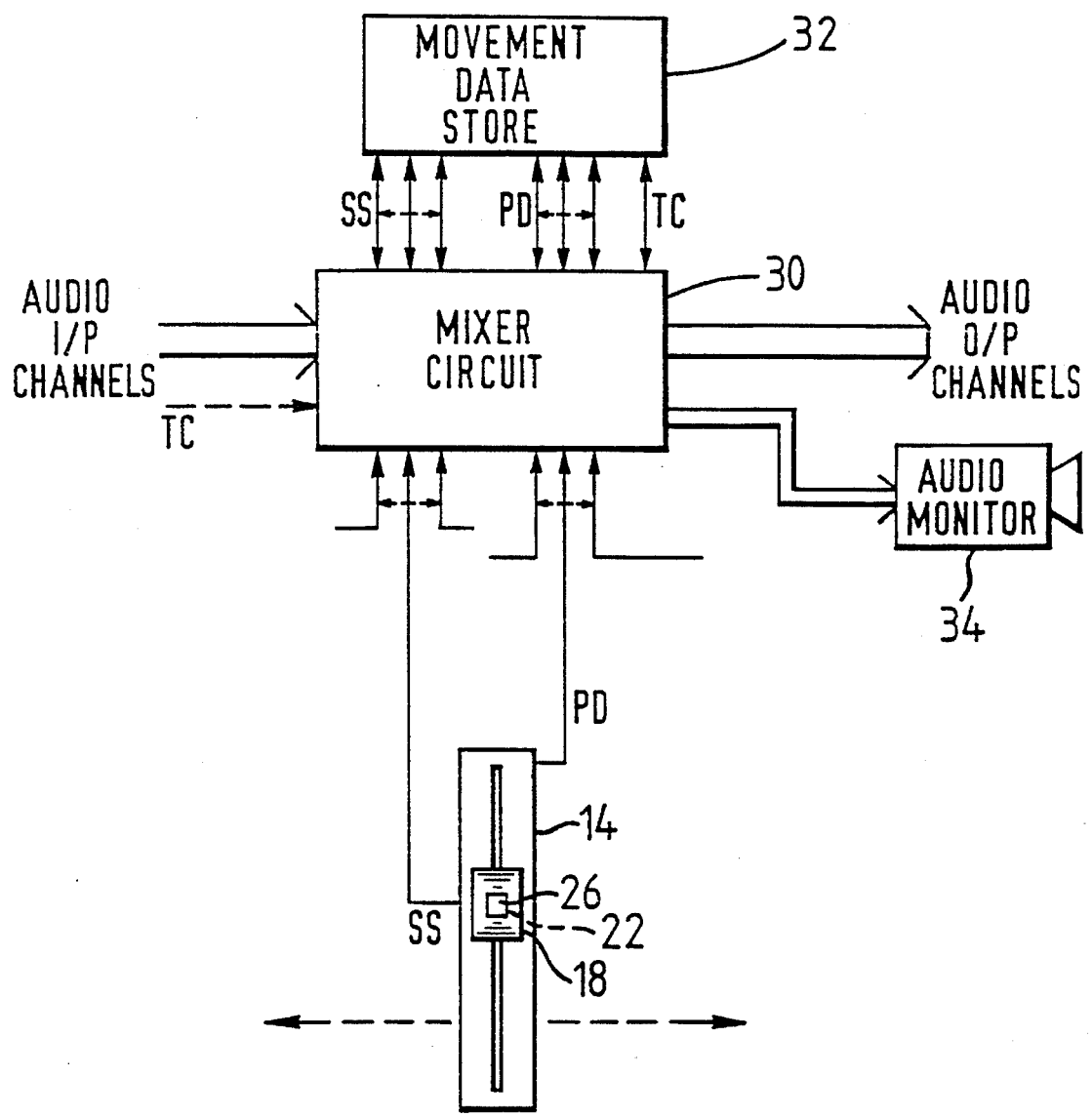
FIG. 3 is a block diagram of a control arrangement fop a mixer console.

FIG. 3 shows in block diagram form a control arrangement for a mixing console using a plurality of the fader/switch arrangements shown in FIGS. 1 and 2. In FIG. 3, a mixer circuit 30 receives fader position data PD from each fader potentiometer 14 (only one of which is shown). The mixer circuit 30 also receives a switch signal SS from each tactile switch 22. The mixer circuit 30 selectively, in response to channel level information provided by the respective fader position data PD, sets the level of corresponding audio input channels supplied to the mixer circuit 30. The audio input channels may be provided by any suitable source, such as a multi-track audio recorder (for example, tape or disc), or may even be derived from a live performance by means of microphones or other transducers. The audio source may also provide a time code TC signal which is supplied to the mixer circuit 30 as a time reference for the audio channels. The mixed audio channels are supplied from the mixer circuit to an audio monitor 34 and also to an audio output for recording, re-recording or the like. The mixer circuit 30 is also connected to a movement data store 32, which can include random access memory, disc storage or the like, for storing the position data history of each fader as movement data. For this purpose, the mixer circuit 30 and the movement data store 32 can interchange the switch signals SS and the position data PD for each fader, as well as the time code TC.

In use, during a mixing operation, the fader knob 18 associated with each channel is set and moved as necessary during the programme and, if the switch 22 has set the movement data store 32 into a record mode, the fader movements for that channel will be stored by the store 32 referenced to the time code TC (which may, for example, be reproduced from a multi-track audio recorder). Subsequently, when reviewing the mix, if it is considered that some adjustment is required, at the appropriate part in the programme, the switch 22 is activated and the fader knob 18 set in the revised position. As soon as the switch 22 has been activated, the movement data store 32 overwrites or otherwise amends the stored movement data with the new movement data. When a point in the audio programme is reached at which it is considered that the original mix was satisfactory, the switch 22 is again activated at which point the store 30 stops overwriting the original movement data. The use of the time code TC ensures that the stored movement data is properly synchronized with the audio programme, and also ensures that overwriting of the movement data will occur at the right time.

Figure 4:
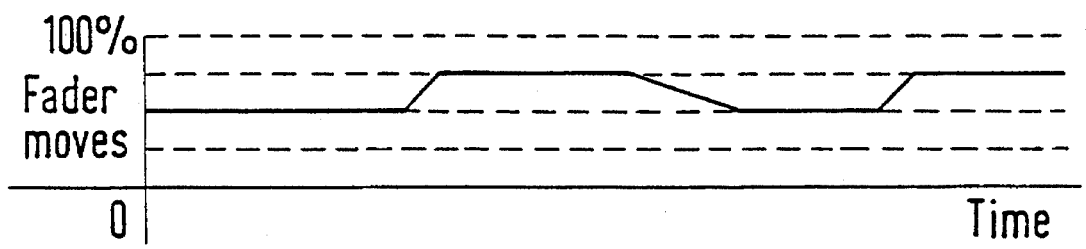
FIGS. 4 to 8 are graphical representations of different operational modes of the control arrangement.

FIG. 4 shows typical movement data for one audio channel. The "fader moves" axis is representative of the position data PD from the respective fader, and the other axis represents time. As shown, the movement data is derived from an "absolute write" operation, namely the movement data is recorded by the store 32 for the first time. The "absolute write" operation can typically be initiated either by activation of the switch 22 at the start of the complete programme, or by means of a master switch (not shown) which can put all or a number of channels into this mode simultaneously. As can be seen from FIG. 4, the fader is initially set to 50% level; at a certain point in the programme the level is increased gradually to 75%. Later, the level is slowly reduced back to 50%, and finally the level is once more increased gradually to 75%. This fader movement history is recorded in the store 32 and can subsequently be amended, as will be described.

Figure 5:
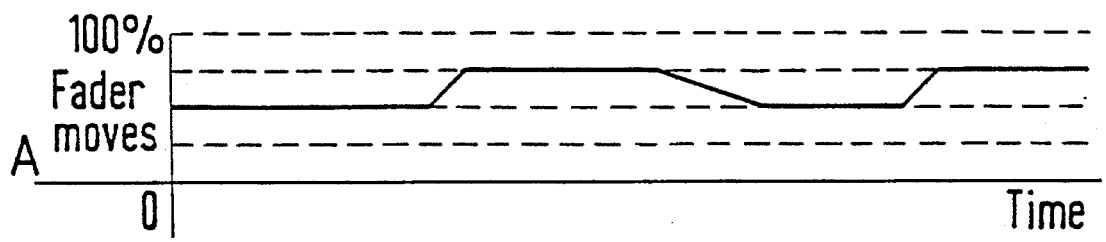
Figure 5:
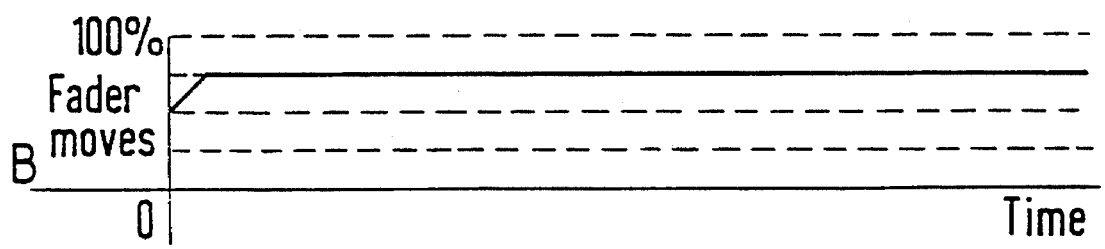
Figure 5:
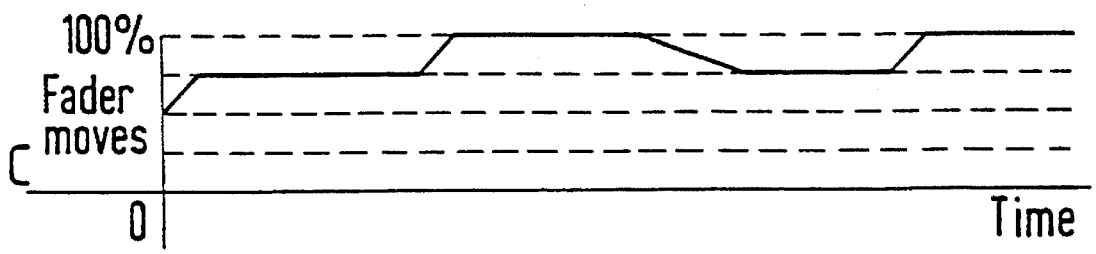

One type of movement data amendment is in the "update trim" mode shown in FIG. 5. The profile A of the movement data is simply the original data (mix 1) shown in FIG. 4. When the circuit is put into "update trim" mode, by activation of a corresponding mode switch, it is possible to "trim" the level of the channel without disturbing the mix profile. This is useful if, for example, the overall level (for the full programme) of a particular channel is too low or too high. The fader position B represents the new update moves, and starts at 50% increasing to 75% and then remains at that point for the rest of the programme. From the profile C, which is the resultant of the mix 1 first and second passes (profiles A and B), it will be seen that the overall level of the programme has been increased so that level changes now take place between 75% and 100%, rather than 50% and 75% as in the first mix of FIG. 4.

Figure 6:
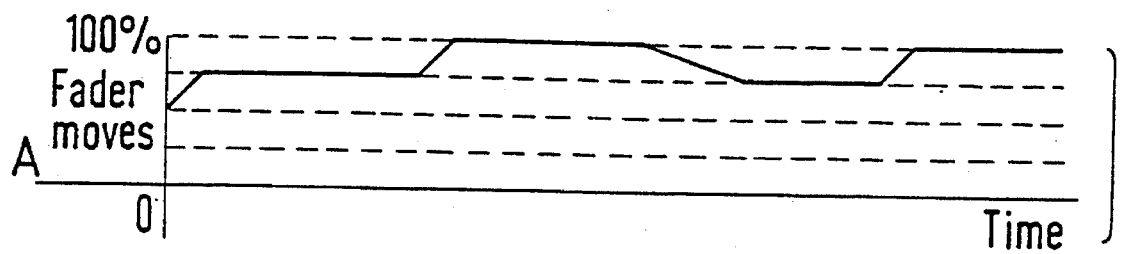
Figure 6:
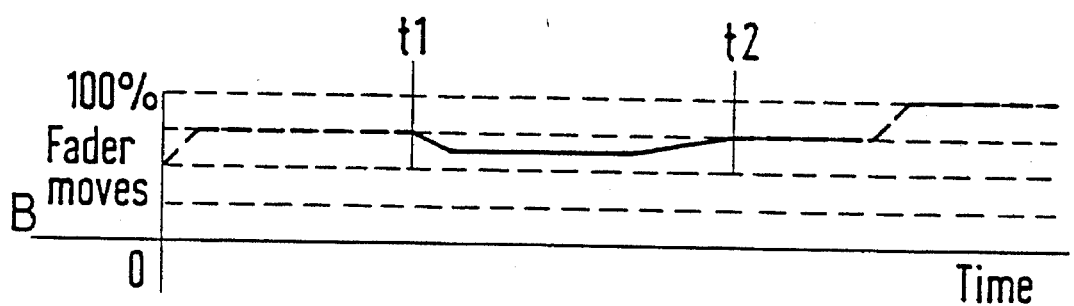
Figure 6:
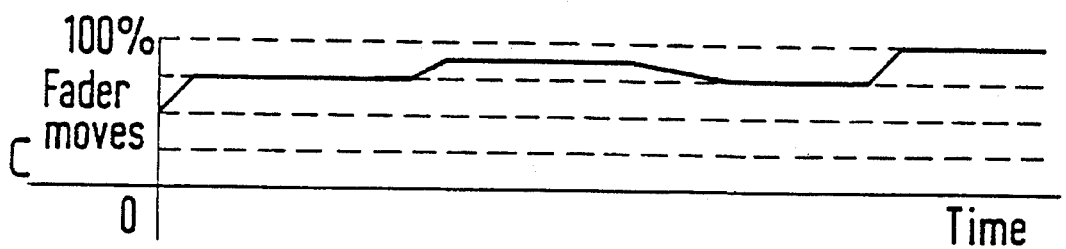

A variation on the FIG. 5 mode is shown in FIG. 6 in which only a part of the programme is to be revised. Once more, the profile A is simply the movement data shown in the profile C of FIG. 5, in other words the previous pass. If it is desired to change that part of the programme between times t1 and t2 as shown in the profile B, the programme is reproduced and, at the time t1, the switch 22 is activated (with the circuit in "update trim" mode). The fader moves made between the times t1 and t2 when the switch 22 is again activated (to disable further updating) are recorded in the store 32 as "trim" values which change the movement data to provide a resultant profile C.

Figure 7:
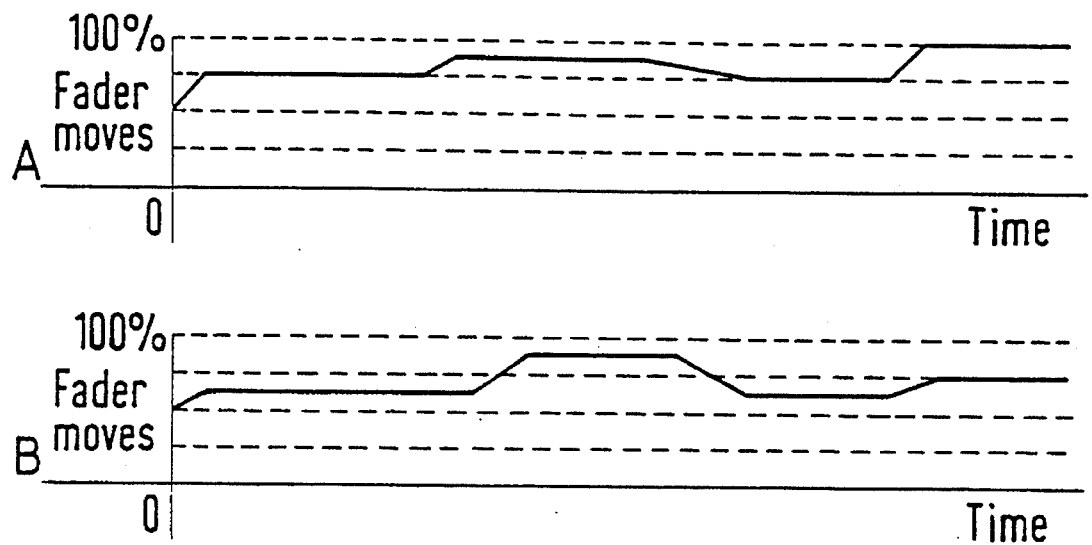

FIG. 7 shows that a full set of movement data can simply be overwritten by an "absolute re-write" operation for a complete programme. The circuit is set into an "absolute overwrite" mode, and the re-write operation can be initiated at the start of the programme either by activation of the switch 22 or by means of the master switch (as described for FIG. 4). The new movement data in the profile B then overwrites the original movement data stored in the store 32 and shown in the profile A.

Figure 8:
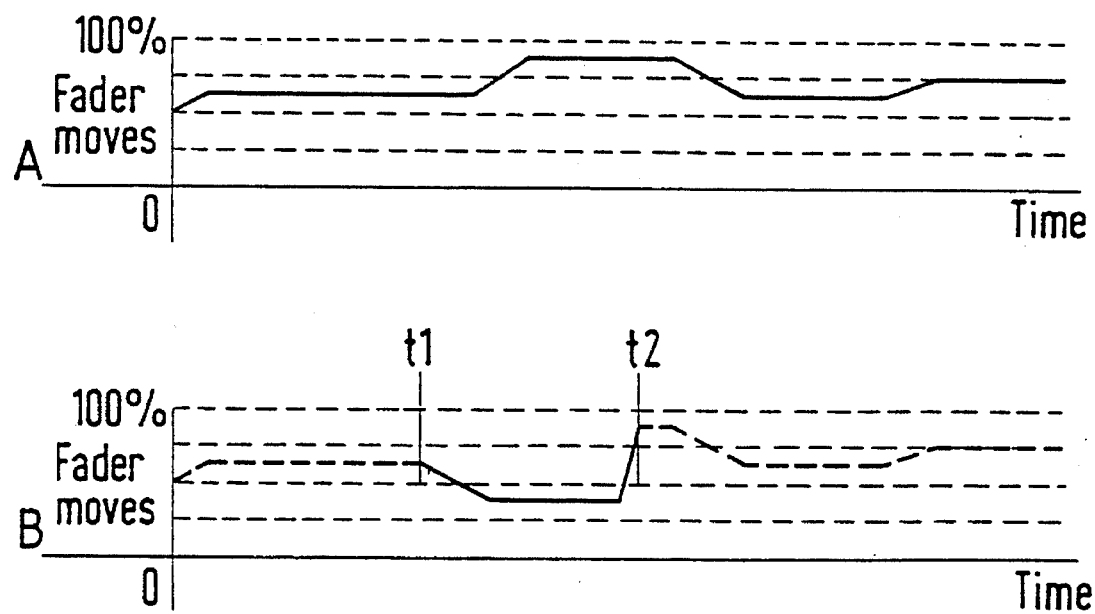

FIG. 8 shows that it is also possible to initiate rewriting (rather than trimming) of movement data for only part of the programme. The profile A represents the previous pass shown in the profile B of FIG. 7 If it is desired to change that part of the programme between the times t1 and t2 as shown in the profile B of FIG. 8, the programme is reproduced and, at the time t1, the switch 22 is activated (with the circuit in "overwrite" not "trim" mode). The fader moves made between the times t1 and t2 when the switch is again activated (to disable further updating) are recorded in the store 32 as new "overwrite" values in place of those previously recorded, to provide a resultant profile C.

It will therefore be seen that, as described above, the arrangement affords a simple technique for recording and overwriting fader movement data. Since movement of the fader and activation of the switch can be controlled by a single finger, it is possible for the user to be implementing other control functions of the console at the same time.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A linear control apparatus comprising:

a plurality of linear potentiometers each having a knob movable throughout a plurality of positions in which each of the positions represents a value of a respective parameter;

mixer means for receiving a plurality of channels of input data having the parameters represented by the linear potentiometers and for mixing the received input data;

storage means operable in a recording mode for recording data of at least one of said linear potentiometers in which the recorded data of a respective linear potentiometer is representative of a data profile which corresponds to the positions of the respective knob over a predetermined period of time, said storage means being further operable in an amending mode for amending a desired portion of the data profile in which the desired portion represents a portion less than the data profile such that a revised data profile is obtained in the amending mode which includes a portion having the recorded data and another portion having amended data and in which the amended data of the desired portion is recorded in the amending mode such that the current recorded data represents the revised data profile; and a plurality of switches each disposed within a respective one of said knobs for selectively enabling and disabling a selected one of the recording and amending modes.

* * * * *